(12) United States Patent
Merz et al.

(10) Patent No.: US 6,213,288 B1
(45) Date of Patent: Apr. 10, 2001

(54) PUCK DELIVERY SYSTEM

(75) Inventors: Gary E. Merz; Edward B. Richter; Robert E. Marowski, all of Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/212,666

(22) Filed: Dec. 16, 1998

(51) Int. Cl.[7] .......................... B65G 47/00; B65G 47/02
(52) U.S. Cl. .......................................... 198/617; 198/346.1
(58) Field of Search ........................ 198/867.01, 606, 198/617, 346.1

(56) References Cited

U.S. PATENT DOCUMENTS 4,180,154 * 12/1979 Andersson ........................ 198/606
4,664,248 * 5/1987 Goodman, Jr. et al. ............. 198/394
5,484,052 * 1/1996 Pawloski et al. ............... 198/867.05

* cited by examiner

*Primary Examiner*—Steven A. Bratlie
(74) *Attorney, Agent, or Firm*—Mark G. Bocchetti; Arthur H. Rosenstein

(57) ABSTRACT

A method has been developed to connect an intermittent parts manufacturing process with a continuous motion assembly process. The method of connection utilizes pucks as a transport vehicle to carry components from the manufacturing process to the assembly process. In addition to eliminating timing problems between the intermittent and continuous processes, the pucks also provide a means of transporting difficult to convey parts. A means of accurately aligning the pucks to the die set in which parts are manufactured and to downstream assembly operations to improve the accuracy and reliability with which the parts are loaded into and removed from the transport pucks has also been developed.

2 Claims, 4 Drawing Sheets

PUCK DELIVERY SYSTEM

FIELD OF THE INVENTION

The invention relates generally to the field of manufacturing systems, and in particular to systems that both fabricate and assemble component parts.

BACKGROUND OF THE INVENTION

In a typical manufacturing system, it is often desirable to connect processes that manufacture the component parts to processes that assemble these parts into a finished product. Some of the benefits of this connection are: reduced labor for material handling; improved product quality, since the parts are not subjected to manual handling that may cause damage to the parts; and a reduction in the work-in-process inventory.

However, there are several potential obstacles to this type of connection that must be overcome. The parts may not lend themselves to conveyance directly, due to their size, shape, or presence of fragile features. The processes themselves may not lend themselves to direct connection. The parts manufacturing operation may be an intermittent process (i.e. part of the machine cycle the tooling is manufacturing the part and the remainder of the machine cycle the part is transferred to the next operation in the operation). The assembly operation, on the other hand, may be continuous motion (i.e. the tooling moves with the parts around a circular turret). When this occurs, it is not possible to time phase the output of the parts manufacturing operation to the input of the assembly operation. Also if too many operations are connected in series, without some time buffer, the overall efficiency of the manufacturing system will be reduced significantly.

SUMMARY OF THE INVENTION

It has been proposed to add a new feature to a film cartridge, such as a 35 mm cartridge after it has been completely assembled and placed into the canister. A method of manufacturing the components, properly orientating them, and assembling them to an existing film cartridge was needed. This created a need to develop a method to merge dissimilar manufacturing operations in a cost effective manner.

The present invention utilizes transport pucks to connect intermittent parts manufacturing processes with continuous motion assembly processes. The use of these transport pucks provides the benefits of interconnection, while overcoming the obstacles noted above.

The invention also provides a means of accurately aligning the pucks to the die set in which parts are manufactured, using some means of separating the pucks, and a lift mechanism to pilot the pucks into the base of the die set. This improves the accuracy and reliability with which the parts can be loaded into the transport pucks.

BRIEF DESCRIPTION OF THE DRAWINGS

The foregoing and other objectives, features, and advantages of the invention will be apparent from the following more particular description, including the presently preferred embodiments of the invention, as illustrated in the accompanying drawings in which.

DETAILED DESCRIPTION OF THE INVENTION

A challenge presented by the above problems is how to handle very thin flat disks that range in thickness from 0.004 to 0.015 inches thick. With the addition of cut outs and tabs, it becomes impractical to handle the disks in bulk form and reorient them at the assembly operation. The solution to this challenge is to link the part manufacturing operation to the assembly operation. There is an inherent problem with a direct link, however. The part manufacturing operation is an intermittent process and requires a time dwell to insert the disks into the assembly tooling. The assembly operation, however, is a continuous motion process and has no such time dwell. To solve this timing issue at manufacture, the disks are placed directly into pucks (FIGS. 2–4) which can be conveyed and buffered between the parts manufacturing and assembly processes. This technique precisely aligns the pucks to the tools that manufacture or punch out the disks.

Figure 1:
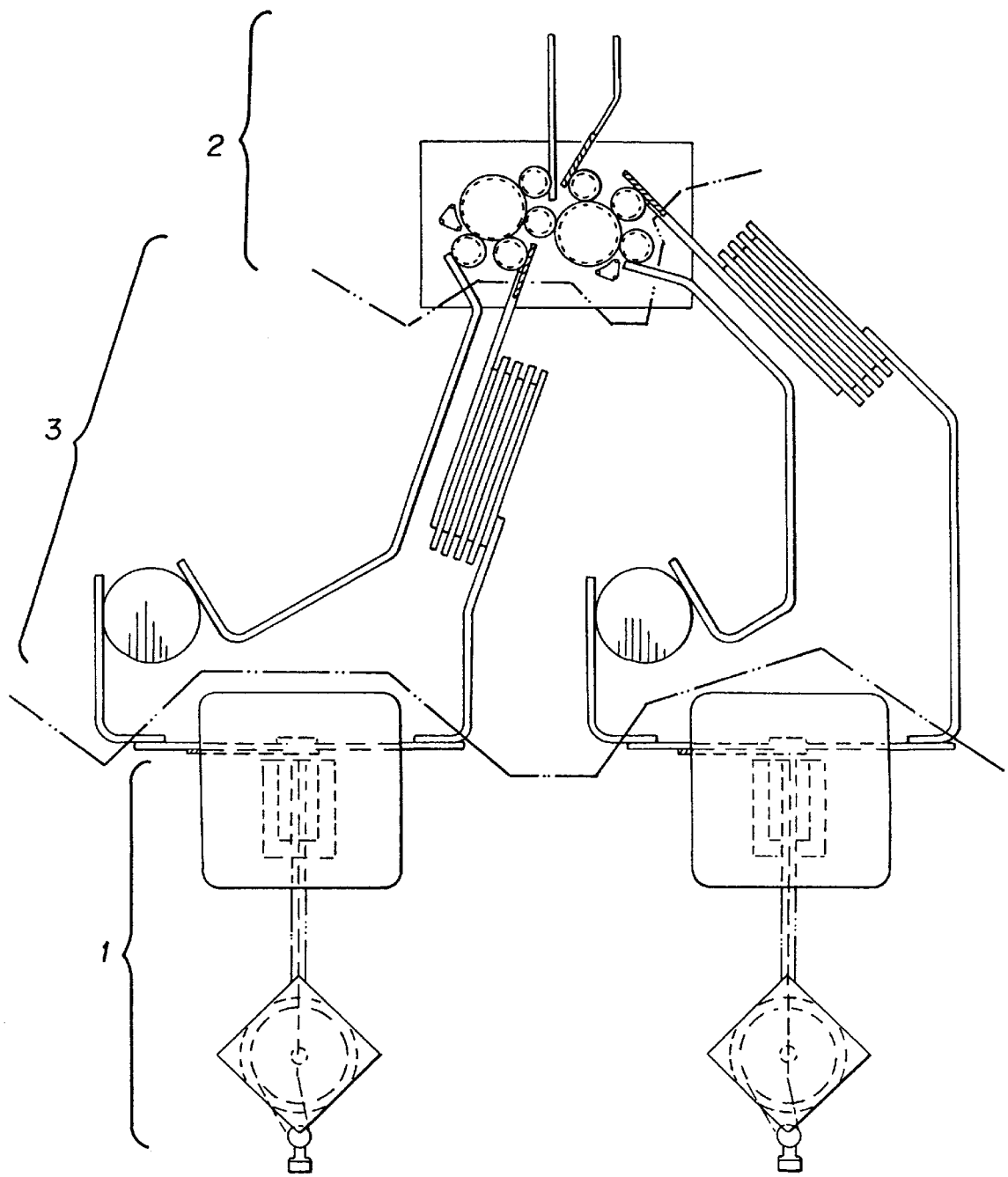
FIG. 1 shows a typical manufacturing system that couples an intermittent process with a continuous motion process.

FIG. 1 depicts a manufacturing system that couples an intermittent process 1, with a continuous process 2 by using a puck buffering system 3. A puck is fundamentally a transport vehicle that carries a component from one manufacturing location or operation to another. In many cases because of the shape, size or other characteristics of the product, there is no easy method to directly transport the component. Hence by placing the component into a puck, it can easily be transported. The other feature that the puck buffering system delivers is the ability to easily bridge the gap between these two distinctly different processes and couple them together. This is particularly important when coupling intermittent and continuous processes.

Figure 2:
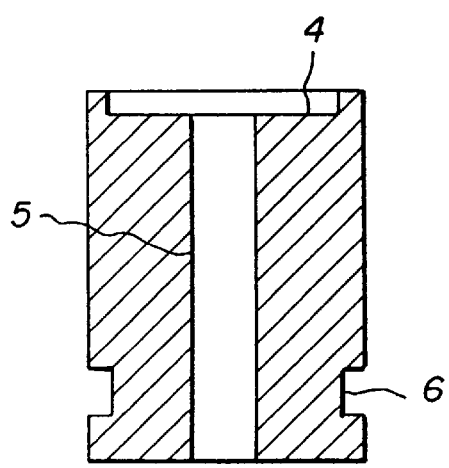
FIG. 2 shows a typical puck.

A puck is shown in FIG. 2 with typical dimensions. Depending on the component the system is developed for, it can be larger or smaller as needed. Some of the subtle features of the puck are; a cavity 4 for the component to sit in, an access hole 5 that goes through the puck for ease of part removal, and a feature on the perimeter 6 to help identify orientation.

Figure 3A:
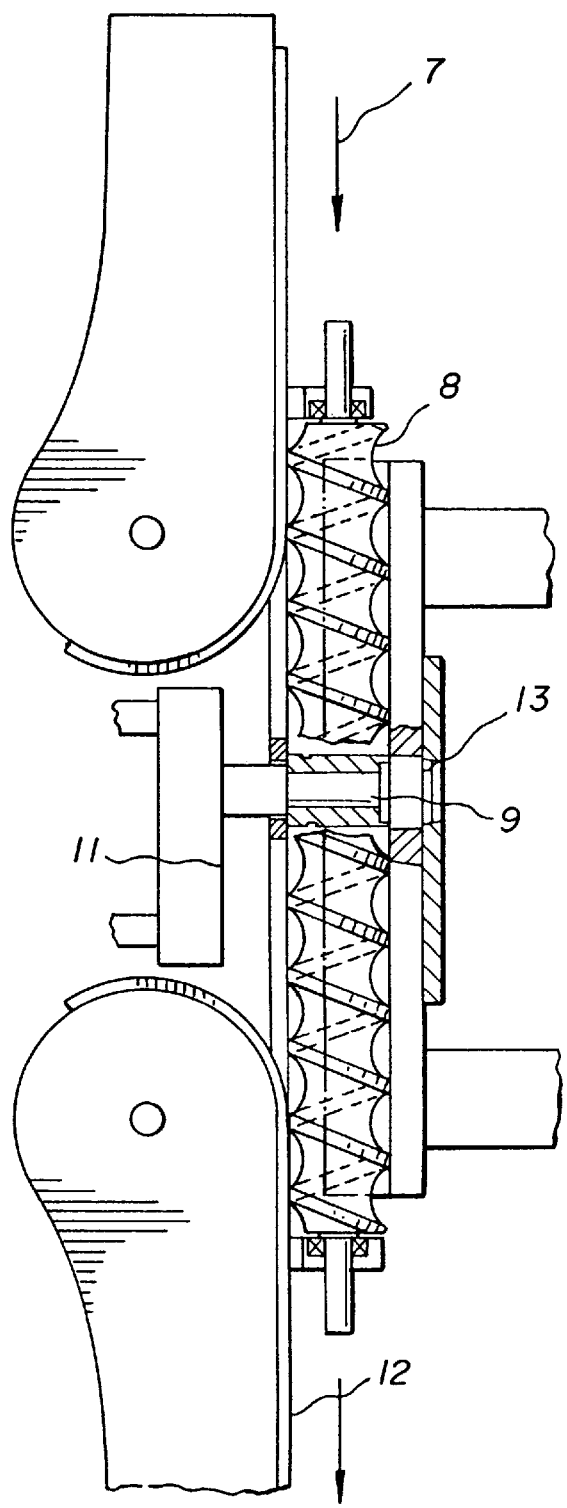
FIG. 3 shows the method of aligning the pucks with the punch and die that is fabricating the pucks.
Figure 3B:
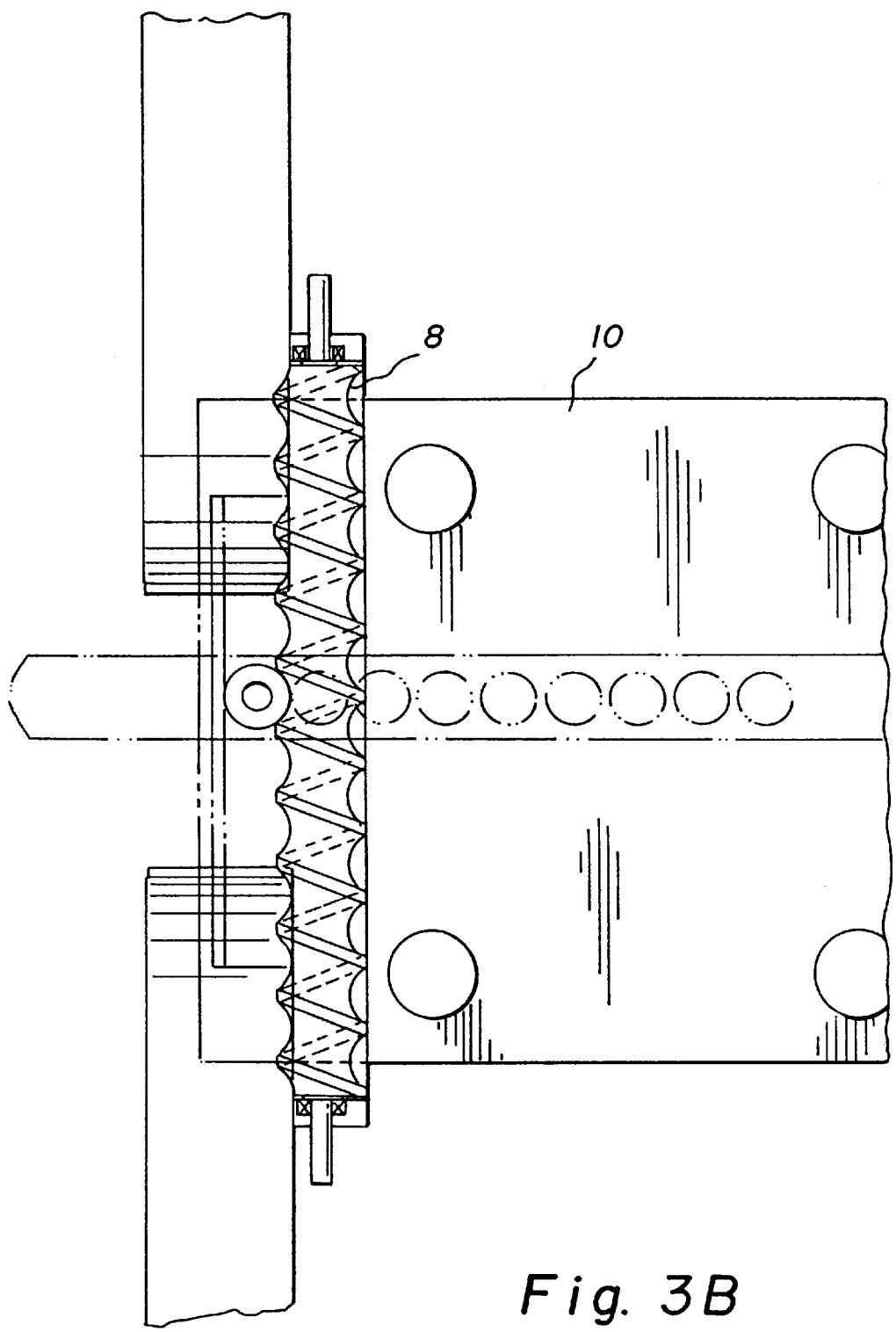

Another unique feature of this process is as shown in FIG. 3. Empty pucks are delivered to the system by a conveyor at position 7. A means of separating the product or pucks is needed so that manufacturing tooling can clearly access the puck without other pucks and/or product being in the way. Without a gap, it would be difficult for tooling to be able to distinguish where one puck ends and the next one begins. This is accomplished by providing tooling to singulate or separate the pucks. Said means can be a separator screw, some type of finger arrangement to separate the pucks, a walking beam, or some other type of apparatus. In this case a separator screw 8 is used and it creates a gap between each puck 9, and also distinctively maintains the position of each one. The separator screw is incorporated into a die set 10 so that by raising the puck lifting sub-assembly 11 the component can be die punched and placed directly into the puck 9. After placing the component in the puck 9, the lifting sub-assembly 11 is lowered and the part exits the die set on the outfeed conveyor 12.

Figure 4:
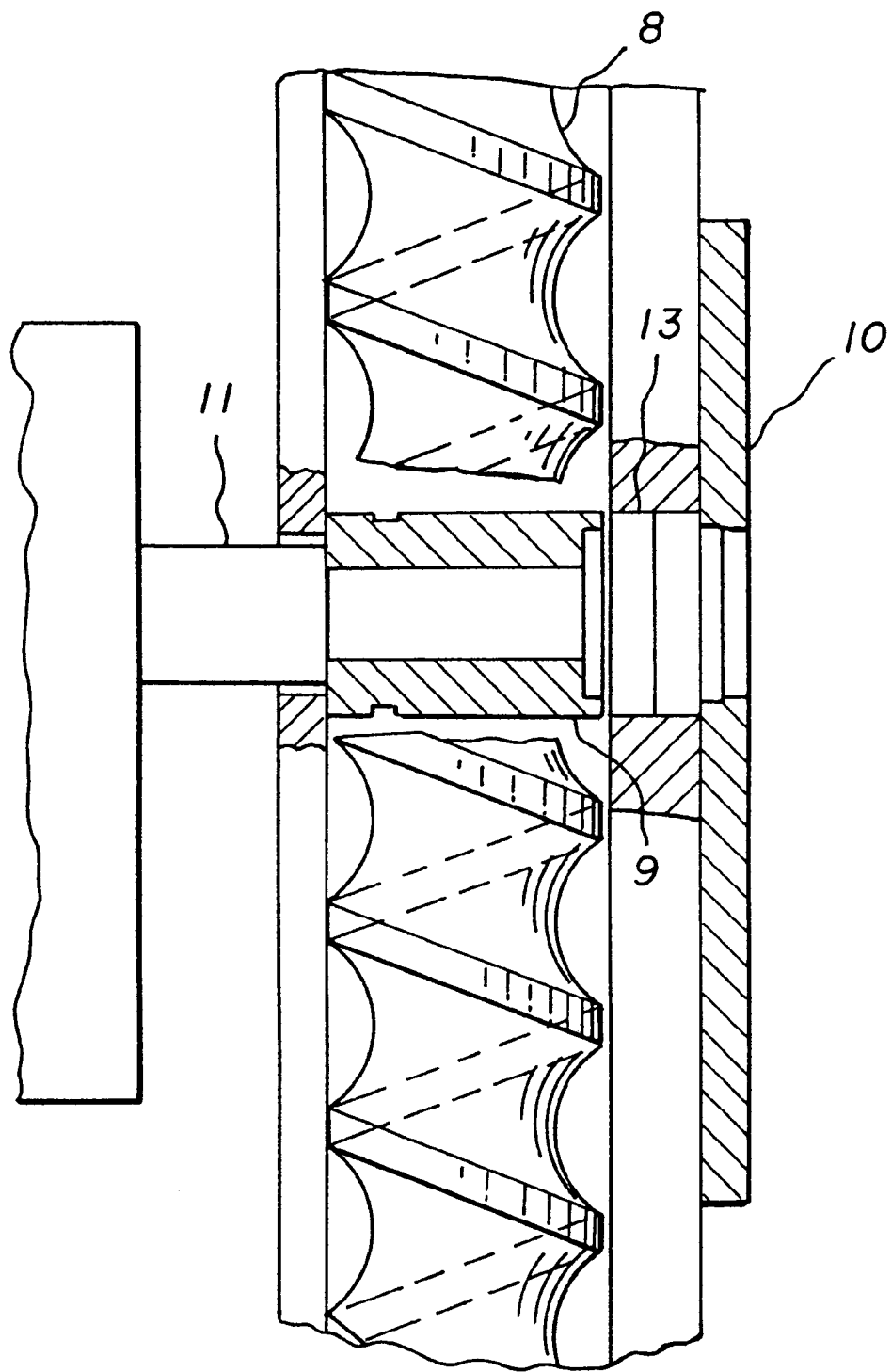
FIG. 4 is an enlarged view of the puck loading area in FIG. 3.

FIG. 4 is an enlarged view of this area again showing the puck 9, and the die set 10. Below is the puck lifting mechanism 11 that will raise the puck 9 up. As it is lifted, it will fit into a recess 13 in the die. This recess 13 provides the ability for the puck 9 to pilot into the die, eliminating any tolerance buildup between the puck 9 and the die 10. This assures that the component is accurately and reliably placed into the puck.

The many features and advantages of the invention are apparent from the detailed specification and thus it is intended by the appended claims to cover all such features and advantages which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of connecting an intermittent parts manufacturing process with a continuous motion assembly process comprising the steps of:

(a) aligning a puck to the intermittent parts manufacturing process while maintaining a predetermined linear gap between adjacent pucks;
   (b) elevating the puck to thereby insert the puck into a die recess in the intermittent parts manufacturing process to receive a single part from the intermittent parts manufacturing process as the single part is made;
   (c) lowering the puck away from the die recess; and
   (d) conveying the puck with the single part supported therein to the continuous motion assembly process.

2. A method of claim 1 wherein:

the linear gap is created and maintained between pucks by driving movement of the pucks with a separator screw as the pucks are moved into position to receive the single parts from the intermittent parts manufacturing process.

\* \* \* \* \*